United States Patent [19]

Shimada et al.

[11] Patent Number: 5,688,309

[45] Date of Patent: Nov. 18, 1997

[54] WATER AND OIL REPELLENT COMPOSITION, TREATING METHOD THEREWITH AND COPOLYMER

[75] Inventors: Toyomichi Shimada; Yuichi Ohmori; Takashige Maekawa, all of Yokohama, Japan

[73] Assignee: Asahi Glass Company Ltd., Toyko, Japan

[21] Appl. No.: 686,710

[22] Filed: Jul. 25, 1996

[30] Foreign Application Priority Data

Jul. 27, 1995 [JP] Japan .................................. 7-191824

[51] Int. Cl.$^6$ ............................ C09K 3/18; C08F 220/00; D06M 15/19
[52] U.S. Cl. ................. 106/2; 252/8.62; 8/115.6; 427/389.9; 427/343.4
[58] Field of Search ........................ 106/2; 8/115.6, 8/189, 115.59; 252/8.62; 427/389.9, 393.4

[56] References Cited

U.S. PATENT DOCUMENTS 5,284,902  2/1994  Huber et al. .......................... 524/544

FOREIGN PATENT DOCUMENTS

| 271 027 | 6/1988 | European Pat. Off. . |
| 351 364 | 1/1990 | European Pat. Off. . |
| 648 887 A1 | 4/1995 | European Pat. Off. . |
| 648 890 A1 | 4/1995 | European Pat. Off. . |
| 656 440 A2 | 6/1995 | European Pat. Off. . |
| 50-19687 | 3/1975 | Japan . |
| 64-26614 | 1/1989 | Japan . |
| 5 262948 | 10/1993 | Japan . |
| 7 197018 | 8/1995 | Japan . |
| 7 216347 | 8/1995 | Japan . |
| 853640 | 11/1960 | United Kingdom . |
| 2 168 990 A | 7/1986 | United Kingdom . |

OTHER PUBLICATIONS

Database WPI, Section Ch, Week 7810, Derwent Publications Ltd., Class A14, AN 78–18928A & JP 50 019 687, Mar. 1 1975, Abstract.
WPIDS Abstract No. 81–16339D which is an abstract of Japanese Patent Specification No. 55–167209 (Dec. 1980).
WPIDS Abstract No. 83–720381 which is an abstract of Japanese Patent Specification No. 58–103550 (Jun. 1983).
WPIDS Abstract No. 89–004526 which is an abstract of Japanese Patent Specification No. 63–284288 (Nov. 1988).

*Primary Examiner*—Anthony Green
*Attorney, Agent, or Firm*—Oblon, Spivak, McClelland, Maier & Neustadt, P.C.

[57] ABSTRACT

A water and oil repellent composition consisting essentially of a copolymer comprising the following polymeric units A, B, C and D, and an organic solvent:

Polymeric units A: Polymeric units derived from an acrylate containing a polyfluoroalkyl group, and/or a methacrylate containing a polyfluoroalkyl group;

Polymeric units B: Polymeric units derived from an acrylate containing a hydrocarbon group, and/or a methacrylate containing a hydrocarbon group;

Polymeric units C: Polymeric units derived from an acid anhydride having an unsaturated group; and Polymeric units D: Polymeric units derived from triallyl cyanurate.

20 Claims, No Drawings

WATER AND OIL REPELLENT COMPOSITION, TREATING METHOD THEREWITH AND COPOLYMER

The present invention relates to a novel water and oil repellent composition and a novel copolymer useful for the water and oil repellent composition.

In recent years, it has been common to treat the surface of e.g. clothings, carpets, and linings of chairs with fluorine-type water and oil repellents. Further, at home, a solvent-type fluorine-type water and oil repellant or an aerosol type fluorine-type water and oil repellant is frequently used, since such a repellant has merits such that treatment is simple and can be carried out at room temperature. The following examples are known with respect to solvent-type fluorine-type water and oil repellants.

(1) A solvent-type water and oil repellant made of a copolymer comprising polymeric units derived from a (meth)acrylate containing a perfluoroalkyl group and polymeric units derived from a (meth)acrylate containing a cyclohexyl group (Japanese Unexamined Patent Publication No. 19687/1975).

(2) A solvent-type water and oil repellant made of a copolymer comprising polymeric units derived from a (meth)acrylate containing a perfluoroalkyl group, polymeric units derived from cyclohexyl (meth)acrylate, polymeric units derived from polyethylene glycol diacrylate, and polymeric units derived from N-methylol acrylamide (Japanese Unexamined Patent Publication No. 26614/1989).

(3) A fiber treating agent comprising a copolymer of a (meth)acrylate containing a perfluoroalkyl group with a (meth)acrylate containing an alkyl group, phthalic anhydride and a hydrocarbon solvent (Japanese Unexamined Patent Publication No. 262948/1993).

(4) A water and oil repellant containing a copolymer comprising polymeric units derived from a polyfluorooxy alkyl group-containing (meth)acrylate, polymeric units derived from a dicarboxylic anhydride group-containing (meth)acrylate and polymeric units derived from octadecyl methacrylate, a hydrocarbon solvent, and ethyl acetate (Japanese Unexamined Patent Publication No. 197018/1995).

(5) A solvent type water-oil repellent composition containing a polymer having polymeric units derived from a (meth)acrylate containing a perfluoroalkyl group, and a cyclic carboxylic anhydride group-containing polymer (Japanese Unexamined Patent Publications No. 197379/1995 and No. 216347/1995).

However, conventional fluorine-type water and oil repellent compositions had drawbacks that no adequate performance was attained for a natural material such as cotton, nylon or a mixed material thereof. Further, to attain good water and oil repellency, it was necessary to increase the fluorine content in the copolymer. However, a copolymer having a high fluorine content had a drawback such that it was expensive, and it was hardly soluble in a solvent to form a solution.

The present inventors have conducted a research to solve the above problems and, as a result, have found that an object treated with a water and oil repellent composition made of a copolymer comprising specific polymeric units, exhibits remarkably high water repellency when dried at room temperature. Further, such a specific copolymer has been found to exhibit high water and oil repellency even when the fluorine content is reduced.

Thus, the present invention provides a water and oil repellent composition consisting essentially of a copolymer comprising the following polymeric units A, B, C and D, and an organic solvent:

Polymeric units A: Polymeric units derived from an acrylate containing a polyfluoroalkyl group, and/or a methacrylate containing a polyfluoroalkyl group;

Polymeric units B: Polymeric units derived from an acrylate containing a hydrocarbon group, and/or a methacrylate containing a hydrocarbon group;

Polymeric units C: Polymeric units derived from an acid anhydride having an unsaturated group; and Polymeric units D: Polymeric units derived from triallyl cyanurate.

Now, the present invention will be described in detail with reference to the preferred embodiments.

In this specification, a polyfluoroalkyl group will be represented by a "$R^f$ group" and an acrylate and/or a methacrylate will be generally represented by a "(meth)acrylate". This will apply to other compounds.

The copolymer in the present invention contains polymeric units (polymeric units A) derived from a (meth)acrylate containing a $R^f$ group.

The (meth)acrylate containing a $R^f$ group, which presents the polymeric units A, is a compound which contains a $R^f$ group as an ester moiety of a (meth)acrylate. The $R^f$ group is a group having at least two hydrogen atoms of an alkyl group substituted by fluorine atoms. The carbon number of the $R^f$ group is preferably from 2 to 20, more preferably from 6 to 16. Further, the $R^f$ group is preferably a linear or branched group. In the case of a branched group, the branched moiety is preferably present at a terminal portion of the $R^f$ group and is preferably a short chain having from 1 to 4 carbon atoms. The $R^f$ group may contain halogen atoms other than fluorine atoms. As such other halogen atoms, chlorine atoms are preferred. Further, an oxygen atom of an ether type or a sulfur atom of a thioether type may be inserted between a carbon-carbon bond in the $R^f$ group.

The number of fluorine atoms in the $R^f$ group is preferably at least 60%, more preferably at least 80%, when represented by the proportion to hydrogen atoms contained in the corresponding alkyl group having the same carbon number as the $R^f$ group. Further, the $R^f$ group is preferably a group having all of the hydrogen atoms of the alkyl group substituted by fluorine atom. In the following description, the $R^f$ group having all of the hydrogen atoms of the alkyl group substituted by fluorine atoms will be referred to as a "perfluoroalkyl group".

The carbon number of the perfluoroalkyl group is preferably from 4 to 16, more preferably from 6 to 12. If the carbon number of the perfluoroalkyl group is small, the water and oil repellency tends to be low. On the other hand, if the carbon number increases, the (meth)acrylate containing the $R^f$ group tends to be solid at room temperature, and the sublimation property tends to increase whereby the handling tends to be difficult. As the $R^f$ group, those groups which are disclosed in the following specific examples and working Examples, are preferred.

As the (meth)acrylate containing a $R^f$ group, a compound of the formula (1) is preferred.

    Formula 1

In the formula (1), $R^f$ represents the $R^f$ group. R is a hydrogen atom or a methyl group.

Q is a bivalent organic group and may, for example, be preferably $-(CH_2)_{p+q}-$, $-(CH_2)_p CONH(CH_2)_q-$, $-(CH_2)_p SO_2 NH(CH_2)_q-$, $-(CH_2)_p SO_2 NR^1 (CH_2)_q-$, $-(CH_2)_p NHCONH(CH_2)_q-$ or $-(CH_2)_p CH(OR^2)$ $(CH_2)_q$—, provided that each of p and q is 0 or an integer of at least 1, and p+q is an integer of from 1 to 22. $R^1$ is a $C_{1-3}$ alkyl group, and $R^2$ is a hydrogen atom, a $C_{1-3}$ alkyl group or a $C_{1-3}$ acyloxy group.

Preferred is the one wherein q is —$(CH_2)_{p+q}$—, —$(CH_2)_p$CONH$(CH_2)_q$— or —$(CH_2)_p$SO$_2$NH$(CH_2)_q$—, and p is an integer of at least 1, and p+q is an integer of from 1 to 6. Particularly preferred is the one wherein Q is —$(CH_2)_{p+q}$— where p+q is from 1 to 6, i.e. from a methylene group to a hexamethylene group. Further, in the formula (1), it is preferred that a fluorine atom is bonded to the carbon atom of $R^f$ bonding to Q.

Now, specific examples of the (meth)acrylate containing a $R^f$ group will be given below, but it should be understood that the present invention is by no means restricted to such specific examples. In the following formulas, R represents a hydrogen atom or a methyl group.

$CF_3(CF_2)_3CH_2OCOCR=CH_2$
$CF_3(CF_2)_4CH_2OCOCR=CH_2$
$CF_3(CF_2)_5CH_2OCOCR=CH_2$
$CF_3(CF_2)_6CH_2CH_2OCOCR=CH_2$
$CF_3(CF_2)_7CH_2CH_2OCOCR=CH_2$
$(CF_3)_2CF(CF_2)_5CH_2CH_2OCOCR=CH_2$
$CF_3(CF_2)_7SO_2N(C_3H_7)CH_2CH_2OCOCR=CH_2$
$CF_3(CF_2)_7(CH_2)_4OCOCR=CH_2$
$CF_3(CF_2)_7SO_2N(CH_3)CH_2CH_2OCOCR=CH_2$
$CF_3(CF_2)_7SO_2N(C_2H_5)CH_2CH_2OCOCR=CH_2$
$CF_3(CF_2)_7CONHCH_2CH_2OCOCR=CH_2$
$(CF_3)_2CF(CF_2)_6(CH_2)_3OCOCR=CH_2$
$(CF_3)_2CF(CF_2)_6CH_2CH(OCOCH_3)OCOCR=CH_2$
$(CF_3)_2CF(CF_2)_6CH_2CH(OH)CH_2OCOCR=CH_2$
$CF_3(CF_2)_8CH_2CH_2OCOCR=CH_2$
$CF_3(CF_2)_8CONHCH_2CH_2OCOCR=CH_2$
$CF_3(CF_2)_7CH_2CH(OH)CH_2CH_2OCR=CH_2$

The copolymer of the present invention may contain two or more different types of polymeric units derived from the (meth)acrylate containing a $R^f$ group. When the copolymer contains two or more different types of polymeric units of the (meth)acrylate containing a $R^f$ group, it preferably contains two or more compounds which differ in the number of carbon atoms in the $R^f$ group.

The copolymer of the present invention contains the polymeric units B together with the polymeric units A. The polymeric units B are polymeric units derived from a (meth)acrylate containing a hydrocarbon group.

The hydrocarbon group in the (meth)acrylate containing a hydrocarbon group, is a group consisting of carbon atoms and hydrogen atoms. The number of carbon atoms in the hydrocarbon group is preferably from 4 to 22. Particularly preferred is an alkyl group, an aralkyl group or an aryl group, and more preferred is an alkyl group.

The alkyl group may have a linear structure, a branched structure or a cyclic structure, preferably a cyclic structure. Further, the cyclic structure may have a substituent. Further, a cyclic moiety in the aralkyl group or the aryl group may also have a substituent.

The (meth)acrylate containing a hydrocarbon group, may, for example, be preferably n-butyl (meth)acrylate, cyclohexyl (meth)acrylate, cyclododecyl (meth)acrylate, isobornyl (meth)acrylate, phenyl (meth)acrylate, benzyl (meth)acrylate, adamantyl (meth)acrylate, tolyl (meth) acrylate, 3,3-dimethylbutyl (meth)acrylate, (2,2-dimethyl-1-methyl)propyl (meth)acrylate, cyclopentyl (meth)acrylate, 2-ethylhexyl (meth)acrylate, t-butyl (meth)acrylate, cetyl (meth)acrylate, stearyl (meth)acrylate or behenyl (meth) acrylate, more preferably a cyclohexyl (meth)acrylate or benzyl (meth)acrylate. The polymeric units B may contain two or more different types.

Further, the copolymer of the present invention contains the polymeric units C together with the polymeric units A and B. The polymeric units C are polymeric units derived from an acid anhydride containing an unsaturated group.

The acid anhydride containing an unsaturated group is a compound of a structure having water removed from two carboxyl groups of a compound having at least two carboxyl groups and one unsaturated group. The acid anhydride containing an unsaturated group is preferably at least one member selected from the group consisting of itaconic anhydride, citraconic anhydride and maleic anhydride. Particularly preferred is maleic anhydride. The polymeric units C may contain two or more different types.

Further, the copolymer of the present invention contains polymeric units D together with the above described polymeric units A to C. The polymeric units D are polymeric units derived from triallyl cyanurate. The polymeric units D have a function to improve the durability of various properties for the water and oil repellent composition and to increase the adhesion to the object to be treated.

Further, the copolymer of the present invention may contain polymeric units derived from polymerizable monomers other than the polymeric units A to D.

By incorporating polymeric units of other polymerizable monomers, it is possible to improve the adhesion to the object to be treated, the crosslinking property or the film-forming property of the copolymer, or the flexibility, the antifouling property or the soil release property. As such other polymerizable monomers, the following examples may be mentioned, but such monomers are not limited to the following examples.

Ethylene, vinyl acetate, vinyl chloride, vinyl fluoride, a vinylidene halide, styrene, α-methylstyrene, p-methylstyrene, poly(oxyalkylene) (meth)acrylate, (meth) acrylamide, diacetone (meth)acrylamide, methylol-modified diacetone (meth)acrylamide, N-methylol (meth)acrylamide, a vinyl alkyl ether, a (halogenated alkyl) vinyl ether, a vinyl alkyl ketone, butadiene, isoprene, chloroprene, glycidyl (meth)acrylate, aziridinyl ethyl (meth)acrylate, isocyanate ethyl (meth)acrylate, aziridinyl (meth)acrylate, hydroxyethyl (meth)acrylate, a (meth)acrylate having an organopolysiloxane group, allyl glycidyl ether, allyl acetate, N-vinyl carbazole, maleimide, N-methylmaleimide, (2-dimethylamino)ethyl (meth)acrylate, or a (meth)acrylate having a blocked isocyanate group.

The polymeric units A in the copolymer is preferably from 10 to 50 wt. %, particularly from 30 to 50 wt. %. If the proportion of the polymeric units A exceeds 50 wt. %, the solubility of the copolymer in a solvent tends to be inadequate, and if it is less than 10 wt. %, no adequate water repellency tends to be obtained.

The polymeric units B in the copolymer is preferably from 40 to 80 wt. %, particularly from 45 to 65 wt. %. The polymeric units C in the copolymer is preferably from 0.1 to 10 wt. %, particularly from 0.5 to 3 wt. %. Further, the polymeric units D in the copolymer is preferably from 0.1 to 10 wt. %, particularly from 1 to 5 wt. %. When polymeric units of other polymerizable monomers are to be incorporated, they may be preferably within a range of from 0.1 to 10 wt. %.

The weight average molecular weight of the copolymer is preferably from 1,000 to 100,000, particularly from 10,000 to 100,000.

The copolymer of the present invention is incorporated into an organic solvent to obtain a water and oil repellent composition.

The polymeric units A in the copolymer are important constituting units to provide the water and the oil repellency.

In a usual fluorine type water and oil repellant, as the fluorine content in the water and oil repellant increases, the water and oil repellency tends to increase. On the other hand, it has a drawback that as the fluorine content increases, it tends to be hardly soluble in an organic solvent.

Whereas, according to the present invention, by incorporating the polymeric units B, C and D to the copolymer, not only the solubility in an organic solvent can be improved by reducing the fluorine content in the copolymer, but it is possible to prevent the substantial decrease in the water and oil repellency even when the fluorine content is reduced. The composition of the present invention has a merit in that it is particularly excellent in providing water and oil repellency to a natural material such as cotton, nylon, or a mixed material thereof.

The acid anhydride containing an unsaturated group has a high level of copolymerizability with triallyl cyanurate, although its copolymerizability with the (meth)acrylate containing a $R^f$ group or with the (meth)acrylate containing a hydrocarbon group, is low. Triallyl cyanurate is a compound which is excellent also in the copolymerizability with the (meth)acrylate containing a $R^f$ group or with the (meth) acrylate containing a hydrocarbon group. Namely, by the combination of the polymeric units C and D, the copolymer can be obtained in good yield. Further, by the coexistence of the polymeric units C and D, excellent water repellency can be obtained against water of a high temperature, and excellent effects can be obtained also in the storage stability.

The copolymer of the present invention comprising such specific four types of polymeric units, exhibits excellent water and oil repellency even when the fluorine content in the copolymer is reduced, and it has a merit that it is excellent in the solubility in an organic solvent.

In the present invention, the fluorine content in the copolymer is preferably from 5 to 35 wt. %, more preferably from 15 to 35 wt. %.

The method for preparing the copolymer is not particularly limited, and a conventional or well known polymerization method may be employed. In the present invention, it is preferred to employ a solution polymerization method, since the composition is made in the form of a solution type water and oil repellant containing an organic solvent, and in the presence of water, decomposition of the acid anhydride containing an unsaturated group, is likely to occur.

The solution polymerization method may be carried out in such a manner that the (meth)acrylate containing a $R^f$ group, the (meth)acrylate containing a hydrocarbon group, the acid anhydride containing an unsaturated group, triallyl cyanurate and, if necessary, other polymerizable monomers, are put into a solvent for polymerization and polymerized by a polymerization initiator such as an organic peroxide, an azo compound or a persulfate or by the action of ionizing radiation such as γ-rays.

The organic solvent may, for example, be an ester solvent, a glycol solvent, an ether solvent, an alcohol solvent, a polar solvent such as a ketone solvent, a halogen-type solvent or a hydrocarbon solvent.

The ester solvent may, for example, be preferably methyl acetate, ethyl acetate, butyl acetate, diethyl succinate, diethyl adipate, dibutyl phthalate or dioctyl phthalate, particularly preferably diethyl succinate.

The halogen-type solvent may, for example, be preferably a chlorinated hydrocarbon such as methylene chloride, trichloroethane or perchloroethylene, a chlorinated fluorohydrocarbon such as dichlorodifluoroethane or dichloropentafluoropropane (HCFC225ca, HCFC225cb, or a mixture thereof), or a fluorohydrocarbon, particularly preferably dichloropentafluoropropane.

The glycol solvent may, for example, be preferably propylene glycol, propylene glycol monomethyl ether, propylene glycol monoethyl ether, propylene glycol monomethyl ether monoacetate, propylene glycol monoethyl ether monoacetate, dipropylene glycol, dipropylene glycol monomethyl ether, or dipropylene glycol monoethyl ether.

The ether solvent may, for example, be preferably tetrahydrofuran or dioxane.

The alcohol solvent may, for example, be preferably ethyl alcohol, butyl alcohol or isopropyl alcohol.

The ketone solvent may, for example, be preferably acetone, methyl ethyl ketone or methyl isobutyl ketone.

The hydrocarbon solvent may, for example, be preferably an aliphatic hydrocarbon solvent such as n-heptane, n-hexane, n-octane, cyclohexane, methylcyclohexane, cyclopentane, methylcycloheptane, methylpentane, 2-ethylpentane, isoparaffin, liquid paraffin, decane, undecane or dodecane, an aromatic hydrocarbon solvent such as toluene or xylene, or a solvent mixture comprising an aliphatic hydrocarbon solvent and an aromatic hydrocarbon solvent. Particularly preferred is a solvent mixture comprising an aliphatic hydrocarbon solvent and an aromatic hydrocarbon solvent.

At least one organic solvent may be used. When one solvent is to be used, it is preferably a halogen-type solvent or a hydrocarbon solvent. When two or more solvents are to be used, it is preferred to use a hydrocarbon solvent and a polar solvent. As the polar solvent, an ester solvent is preferred.

As the organic solvent to be incorporated in the water and oil repellent composition, it is preferred to employ an organic solvent of the same type as the organic solvent to be used as the above-mentioned solvent for polymerization. Particularly from the viewpoint of inflammability, odor, the working environment, the storage stability of the composition, etc., it is preferred to employ at least one of halogen-type solvents, at least one of hydrocarbon solvents, or a solvent mixture of at least one of hydrocarbon solvents and at least one of polar solvents.

The amount of the copolymer in the water and oil repellent composition of the present invention is preferably from 0.1 to 50 parts by weight, more preferably from 20 to 50 parts by weight, per 100 parts by weight of the organic solvent. The copolymer of the present invention is excellent in the solubility in an organic solvent and thus has a merit that the copolymer concentration can be made high.

The water and oil repellent composition in the present invention may be used as properly diluted at the time of its use, depending upon the particular purpose or depending upon the time of the object to be treated. To dilute the composition, it is advisable to select a solvent capable of presenting good solubility for the copolymer, and it is preferred to select an organic solvent of the same type as the solvent for polymerization.

The water and repellent composition of the present invention may contain other compounds in addition to the above compounds. As such other compounds, other water repellants or oil repellants, or other polymer blenders, or additives such as a crosslinking agent, an insecticide, a flame retardant, an antistatic agent, an anti-crease agent, etc. may, for example, be mentioned.

These compounds may be optionally changed depending upon the object to be treated or the purpose for the treatment with the water and oil repellants.

The water and oil repellent composition of the present invention can be applied to an article to be treated by an optional method. For example, a method may be employed wherein it may be coated on the surface of the particle to be treated by a known method for coating such as dip coating, followed by drying. The article thus treated may simply be left to dry at room temperature, preferably from 10° to 30° C., whereby excellent water and oil repellency can be imparted to the surface of the treated article. If necessary, curing may be carried out.

Further, the water and oil repellent composition of the present invention may be filled into a container under pressure to form a so-called aerosol formulation. The aerosol type water and oil replant may simply be sprayed onto an article to be treated, whereupon it will immediately dry to provide adequate performance.

The article to be treated by the present invention is not particularly limited, and various types of articles may be mentioned. For example, fibers, fiber fabrics, fiber knitted products, glass, paper, wood, leather, wool, asbestos, bricks, cement, ceramics, metals and metal oxides, porcelains, plastics and coated surfaces, may be mentioned. The fibers include, for example, animal and plant natural fibers such as cotton, hemp, wool and silk, synthetic fibers such as polyamides, polyesters, polyvinyl alcohols, polyacrylonitriles, polyvinyl chlorides and polypropylene, semisynthetic fibers such as rayon and acetate, inorganic fibers such as glass fibers and asbestos fibers, and mixed fibers thereof.

Now, the present invention will be described in further detail with reference to Examples. However, it should be understood that the present invention is by no means restricted to such specific Examples.

EXAMPLE 1

Added as polymerizable compounds to a 100 ml glass polymerization ampule were 4.80 g (40 parts by weight) of $C_nF_{2n+1}CH_2CH_2OCOCH=CH_2$ (wherein n is a mixture of integers of from 6 to 12, the average of n being 9, hereinafter referred to as FA), 6.72 g (56 parts by weight) of cyclohexyl methacrylate (hereinafter referred to as CHMA), 0.12 g (1 part by weight) of maleic anhydride (hereinafter referred to as MAH), 0.36 g (3 parts by weight) of triallyl cyanurate (hereinafter referred to as TAC), 0.22 g of 2,2-azobis(2-methylbutylonitrile) (V-59, tradename, manufactured by Wako Junyaku Kogyo K.K.) and 27.6 g of dichloropentafluoropropane, and the mixture was polymerized at 70° C. for 108 hours under shaking in a nitrogen atmosphere.

The reaction crude solution was analyzed by gas chromatography (hereinafter referred to as GC), whereby no polymerizable compound was detected. The obtained reaction product was analyzed by gel permeation chromatography (hereinafter referred to as GPC), whereby the weight average molecular weight (calculated as polystyrene) was 70,000.

EXAMPLE 2

Added as polymerizable compounds to a 100 ml glass polymerization ampule were 420 g (35 parts by weight) of FA, 7.32 g (61 parts by weight) of CHMA, 0.12 g (1 part by weight) of MAH, 0.36 g (3 parts by weight) of TAC, 0.22 g of V-59, and 27.6 g of a hydrocarbon solvent containing an aromatic hydrocarbon solvent (White Spirit LAWS, tradename, manufactured by Shell Japan Co., Ltd.), and the mixture was polymerized at 60° C. for 18 hours under shaking in a nitrogen atmosphere.

The reaction crude solution was analyzed by GC, whereby no polymerizable compound was detected. The reaction product was analyzed by GPC, whereby the weight average molecular weight (calculated as polystyrene) was 70,000.

EXAMPLE 3

Polymerization was carried out in the same manner as in Example 2 except that the polymerizable compounds as identified in the upper section in Table 1 were used in the amounts (parts by weight) as identified in the upper section in Table 1.

The reaction crude solution was analyzed by GC, whereby no polymerizable compound was detected. The obtained reaction product was analyzed by GPC, whereby the weight average molecular weight (calculated as polystyrene) was 70,000.

TABLE 1

| Example No. | 1 | 2 | 3 | 4 | 5 | 6 | 7 |
|---|---|---|---|---|---|---|---|
| FA | 40 | 35 | 45 | 40 | 50 | 30 | 40 |
| CHMA | 56 | 61 | 51 | 57 | 47 | | |
| MAH | 1 | 1 | 1 | | | | |
| TAC | 3 | 3 | 3 | | | | |
| TBMA | | | | | | 70 | |
| EHMA | | | | | | | |
| SMA | | | | | | | 60 |
| St | | | | 3 | 3 | | |
| Cotton | 90+ | 80+ | 80+ | 70 | 70+ | 50+ | 50– |
| Nylon | 100 | 100 | 90+ | 70+ | 80– | 70 | 50+ |

EXAMPLE 4

(Comparative Example)

Added as polymerizable compounds to a 100 ml glass polymerization ampule were 4.80 g (40 parts by weight) of FA, 6.84 g (57 parts by weight) of CHMA, 0.36 g (3 parts by weight) of styrene (hereinafter referred to as St), 0.22 g of V-59, 13.8 g of a hydrocarbon solvent containing an aromatic hydrocarbon solvent (Mineral Spirit A, tradename, manufactured by Nippon Oil Company, Ltd.) and 13.8 g of diethyl succinate, and the mixture was polymerized at 60° C. for 18 hours under shaking in a nitrogen atmosphere.

EXAMPLES 5 to 13

(All Comparative Examples)

Polymerization was carried out in the same manner as in Example 4 except that the polymerizable compounds as identified in the upper section in Table 1 or in the upper section in Table 2 were used in the amounts (parts by weight) as identified in the respective upper sections.

EXAMPLE 14

(Comparative Example)

Polymerization was carried out in the same manner as in Example 1 except that the polymerizable compounds as identified in the upper section in Table 2 were used in the amounts (parts by weight) as shown in the upper section in Table 2.

In Tables 1 and 2, TBMA represents t-butyl methacrylate, EHMA 2-ethylhexyl methacrylate, and SMA stearyl methacrylate.

TABLE 2

| Example No. | 8 | 9 | 10 | 11 | 12 | 13 | 14 |
|---|---|---|---|---|---|---|---|
| FA | 40 | 30 | 30 | 40 | 40 | 50 | 40 |
| CHMA | | | | | | | |
| MAH | | 2 | 2 | 1 | 2 | 2 | |
| TBMA | | 68 | | | | | |
| EHMA | 57 | | | 56 | | | 57 |
| SMA | | | 68 | | 58 | 48 | |
| St | 3 | | | 3 | | | 3 |
| Cotton | 50– | 80+ | 70– | 70 | 70– | 80– | 70 |
| Nylon | 70– | 90+ | 70+ | 80 | 70+ | 80+ | 70+ |

Evaluation of Water Repellency

Mineral Spirit A was added to each of the reaction crude solutions obtained in Examples 1 to 14, to obtain a treating bath having the concentration of the copolymer adjusted to be 0.5 wt. %. A cotton cloth and a nylon cloth were prepared as cloths to be treated, and the cloths to be treated were respectively dipped in the treating bath and then squeezed by a mangle so that the pick up was 80%. Then, the treated cloths were dried for three hours in a constant temperature humidity chamber (at 25° C. under a relative humidity of 60%). Evaluation of the water repellency was carried out by a spray test in accordance with JIS L1092 and represented by the water repellency number as identified in Table 3. The symbol + or – attached to the water repellency number means that the respective property is slightly better or poor, respectively. The evaluation results are shown in the lower section in Table 1 and in the lower section in Table 2.

TABLE 3

| Water repellency number | State |
|---|---|
| 100 | The surface is free from deposition or wetting |
| 90 | Slight deposition or wetting is observed on the surface |
| 80 | Partial wetting is observed on the surface |
| 70 | Wetting is observed on the surface |
| 50 | Wetting is observed over the entire surface |
| 0 | Both the front and rear surfaces are completely wetted |

EXAMPLE 15

Added as polymerizable compounds to a 100 ml glass polymerization ampule were 5.40 g (45 parts by weight) of FA, 6.12 g (51 parts by weight) of CHMA, 0.12 g (1 part by weight) of MAH, 0.36 g (3 parts by weight) of triallyl cyanurate, 0.22 g of V-59, 13.8 g of Mineral Spirit A, and 13.8 g of diethyl succinate, and the mixture was polymerized at 60° C. for 18 hours under shaking in a nitrogen atmosphere.

The obtained reaction crude solution was treated in the same manner, and water repellency was evaluated by using water different in the temperature. The results are shown in Table 4.

EXAMPLE 16

(Comparative Example)

Using a conventional solvent type water repellant containing no MAH of Example 15, evaluation was carried out in the same manner. The results are shown in Table 4.

TABLE 4

| Example | 15 | | 16 | |
|---|---|---|---|---|
| Temperature of water | Cotton | Nylon | Cotton | Nylon |
| 27° C. | 90+ | 100 | 70+ | 80+ |
| 45° C. | 90– | 90+ | 50+ | 80– |
| 60° C. | 80+ | 80+ | 0 | 70+ |
| 80° C. | 70+ | 80 | 0 | 0 |

EXAMPLE 17

(Comparative Example)

Added as polymerizable compounds to a 100 ml glass polymerization ampule were 4.80 g (40 parts by weight) of FA, 6.72 g (56 parts by weight) of CHMA, 0.12 g (1 part by weight) of MAH, 0.36 g (3 parts by weight) of SMA, 0.22 g of V-59 and 27.6 g of mineral terpin, and the mixture was polymerized at 60° C. for 18 hours under shaking in a nitrogen atmosphere.

The obtained reaction crude solution was treated in the same manner as reaction crude solution in Example 1, and the water repellency was evaluated, whereby the results was 90+ for cotton and 100 for nylon. However, when the reaction crude solution was stored at 2° C. for one month, the solution underwent gelation.

The reaction products of Examples 1 to 3 were likewise stored at 2° C. for one month, whereby no gelation was observed.

With the water and oil repellent composition of the present invention, excellent water repellency can be imparted simply by carrying out the drying after treatment at room temperature. Further, the water and oil repellent composition of the present invention is capable of imparting high water repellency by room temperature drying even when treatment is applied to a natural material such as cotton, nylon or a mixed material thereof, to which it used to be difficult to impart repellency by conventional water and oil repellants.

Further, the water and oil repellent composition of the present invention has a merit that even when the copolymer is made to have a low fluorine content, it is possible to obtain practically satisfactory water repellency. With the water and oil repellent composition, not only the concentration of the copolymer can be made high, but also the composition is excellent in the storage stability when stored under such a high concentration.

The article treated with the water and oil repellent composition of the present invention exhibits water repellency against water of a high temperature and thus is practically useful, and when applied to household fiber products, it provides excellent water repellency against e.g. coffee, tea or a soup.

What is claimed is:

1. A water and oil repellent composition consisting essentially of a copolymer comprising the following polymeric units A, B, C and D, and an organic solvent:

Polymeric units A: Polymeric units derived from an acrylate containing a polyfluoroalkyl group, and/or a methacrylate containing a polyfluoroalkyl group;

Polymeric units B: Polymeric units derived from an acrylate containing a hydrocarbon group, and/or a methacrylate containing a hydrocarbon group;

Polymeric units C: Polymeric units derived from an acid anhydride having an unsaturated group; and Polymeric units D: Polymeric units derived from triallyl cyanurate.

2. The water and oil repellent composition according to claim 1, wherein the copolymer contains from 10 to 50 wt. % of the polymeric units A.

3. The water and oil repellent composition according to claim 1, wherein the copolymer contains from 40 to 80 wt. % of the polymeric units B.

4. The water and oil repellent composition according to claim 1, wherein the copolymer contains from 0.1 to 10 wt. % of the polymeric units C and from 0.1 to 10 wt. % of the polymeric units D.

5. The water and oil repellent composition according to claim 1, wherein the polymeric units A are polymeric units from an acrylate containing a $C_{4-16}$ polyfluoroalkyl group, and/or a methacrylate containing a $C_{4-16}$ polyfluoroalkyl group.

6. The water and oil repellent composition according to claim 1, wherein the polymeric units A are polymeric units derived from an acrylate containing a $C_{4-16}$ perfluoroalkyl group, and/or a methacrylate containing a $C_{4-16}$ perfluoroalkyl group.

7. The water and oil repellent composition according to claim 1, wherein the polymeric units B are polymeric units derived from cyclohexyl acrylate and/or cyclohexyl methacrylate.

8. The water and oil repellent composition according to claim 1, wherein the polymeric units C are polymeric units derived from at least one member selected from the group consisting of itaconic anhydride, citraconic anhydride and maleic anhydride.

9. The water and oil repellent composition according to claim 1, wherein the polymeric units C are polymeric units derived from maleic anhydride.

10. The water and oil repellent composition according to claim 1, wherein the copolymer has a fluorine content of from 5 to 35 wt. %.

11. The water and oil repellent composition according to claim 1, wherein the copolymer has a weight average molecular weight of from 1,000 to 100,000.

12. The water and oil repellent composition according to claim 1, wherein the organic solvent is a halogen-containing solvent, a hydrocarbon solvent or a solvent mixture of a hydrocarbon solvent and a polar solvent.

13. The water and oil repellent composition according to claim 1, wherein the organic solvent is dichloropentafluoropropane.

14. The water and oil repellent composition according to claim 1, wherein the organic solvent is a solvent mixture of an aliphatic hydrocarbon solvent and an aromatic hydrocarbon solvent.

15. The water and oil repellent composition according to claim 1, wherein the organic solvent is a solvent mixture of an aliphatic hydrocarbon solvent, an aromatic hydrocarbon solvent and an ester solvent.

16. The water and oil repellent composition according to claim 1, wherein the copolymer is from 0.1 to 50 parts by weight per 100 parts by weight of the organic solvent.

17. A treating method with a water and oil repellent composition, which comprises coating the water and oil repellent composition as defined in claim 1, on fibers or on a fiber product.

18. A treating method with a water and oil repellent composition, which comprises coating the water and oil repellent composition as defined in claim 1, on cotton fibers, nylon fibers or mixed fibers of cotton and nylon.

19. A treating method with a water and oil repellent composition, which comprises coating the water and oil repellent composition as defined in claim 1, on fibers or a fiber product, followed by drying at room temperature.

20. A treating method with a water and oil repellent composition, which comprises coating the water and oil repellent composition as defined in claim 1, on cotton fibers, nylon fibers or mixed fibers of cotton and nylon, followed by drying at room temperature.

* * * * *